July 25, 1933.   D. G. ROOS   1,919,670
VEHICLE SPRING SUSPENSION
Filed June 8, 1932   2 Sheets-Sheet 2
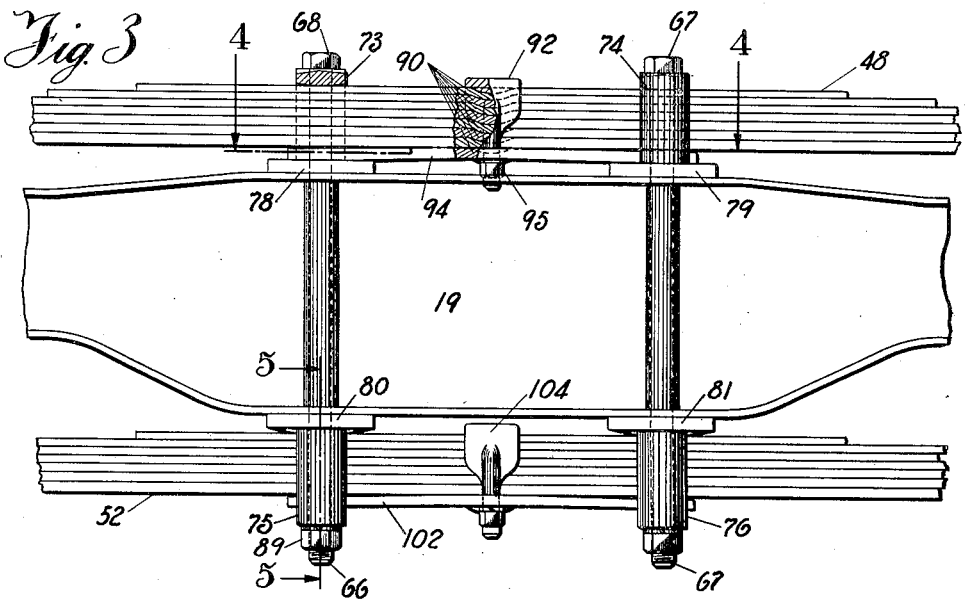
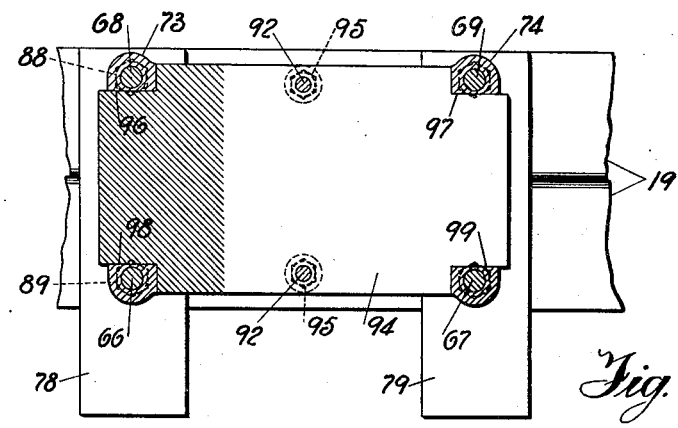
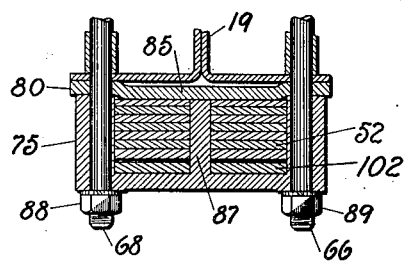
INVENTOR.
Delmar G. Roos
BY
P. W. Pomeroy
ATTORNEY Patented July 25, 1933

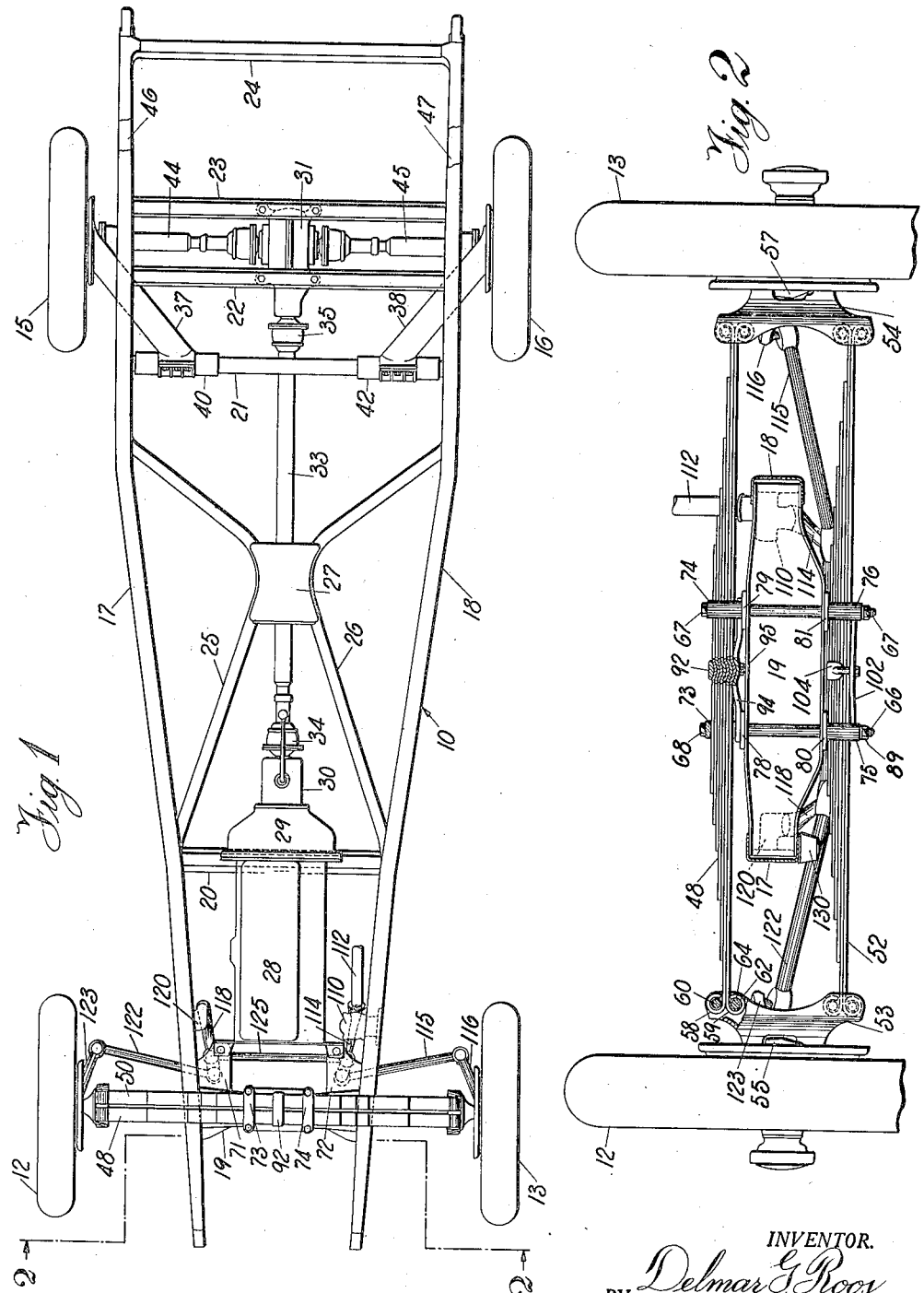

1,919,670

UNITED STATES PATENT OFFICE

DELMAR G. ROOS, OF SOUTH BEND, INDIANA, ASSIGNOR TO THE STUDEBAKER CORPORATION, OF SOUTH BEND, INDIANA, A CORPORATION OF NEW JERSEY

VEHICLE SPRING SUSPENSION

Application filed June 8, 1932. Serial No. 615,992.

This invention relates to improvements in spring suspension for automotive vehicle and particularly to improvement in the spring suspension of the front steering wheels of such vehicles, and has for its principal object the provision of means for supporting the chassis frame upon the wheels and at the same time permitting independent motion of each wheel relative to the chassis frame.

A further object lies in the provision of means for maintaining the wheels in vertical alignment relative to the chassis frame and for maintaining the chassis frame accurately centered relative to the wheels.

A still further object lies in the provision of means in combination with transverse springs for supporting the chassis frame upon the wheels which will permit flexure of the entire length of the transverse springs upon motion of either wheel relative to the chassis frame.

It is also an object to provide a steering gear in which any error in steering geometry due to flexure of the transverse springs will be avoided.

It is an additional object to provide a device of the character described which is simple and rugged in construction, economical to manufacture, easy to install, and which will not readily get out of order in use.

Other objects and advantages will appear as the description proceeds.

The drawings illustrate an acceptable mechanical embodiment of the idea of the invention. The drawings, however, are not to be taken as limiting the invention, the scope of which is to be measured entirely by the scope of the sub-joined claims.

In the drawings:

Figure 1 is a plan view of the chassis of an automotive vehicle showing the device of the invention applied thereto.

Figure 2 is a sectional view on the line 2—2 of Figure 1.

Figure 3 is a view on an enlarged scale similar to Figure 2 showing a portion of the structure illustrated in Figure 2 and certain of the details of construction.

Figure 4 is a sectional view on the line 4—4 of Figure 3.

Figure 5 is a sectional view on the line 5—5 of Figure 3.

Referring to the drawings in detail and particularly to Figure 1, the numeral 10 generally indicates a vehicle chassis frame supported upon front wheels 12 and 13 and upon rear wheels 15 and 16 by my improved spring suspension.

The chassis frame comprises side frame members 17 and 18 connected by cross members 19, 20, 21, 22, 23 and 24 and by X frame members 25 and 26 secured at their ends to the side frame members 17 and 18 respectively and secured together intermediate their length by a plate 27. A motor 28, clutch 29, and transmission 30 are operatively supported upon the cross members 19 and 20 and a differential 31 is operatively supported upon the two cross members 22 and 23. A propeller shaft 33 connects the transmission with the differential and is provided at either end thereof with universal joints 34 and 35. Pivoted arms 37 and 38 are pivotally mounted upon the cross member 21 adjacent to the opposite ends thereof by means of sleeve members 40 and 42. These pivoted arms 37 and 38 carry the rear wheels 15 and 16 at their free ends, the wheels being operatively connected with the differential 31 by means of the flexible driving axles 44 and 45. Leaf springs 46 and 47 mounted beneath the side frame members 17 and 18 respectively at the rear thereof resiliently support the chassis frame upon the rear wheels 15 and 16.

As this rear wheel spring suspension is completely described in my co-pending application, Serial No. 615,991 filed on even date herewith, it is believed that no further description of this construction is necessary for the purpose of this disclosure.

From a further inspection of Figure 1, it will be observed that the front wheels 12 and 13 are resiliently connected to the chassis frame by means of transverse leaf springs, two of which are indicated at 48 and 50. Two similar leaf springs, one of which is illustrated at 52 in Figure 2, are positioned immediately below the leaf springs 48 and 50 as indicated in Figure 2. These leaf springs are pivotally connected at their ends to wheel carrying brackets 53 and 54 provided with apertured lugs to which the wheel carrying spindles 55 and 57 are pivotally connected by means of knuckle pins, not illustrated.

From an inspection of Figure 2, it will be observed that the two lower leaves of each spring are bent at each end thereof to provide two similar oppositely extending eyes as indicated at 58 and 59 at each end of each spring. Spring bolts, two of which are indicated at 60 and 62, extend through these eyes and a bushing indicated at 64 is interposed between one of each pair of spring bolts and the corresponding spring eye to provide a close bearing fit between the eye and the spring bolt. The bushing is omitted from the other spring bolt of each pair to permit slight relative motion between the spring bolt and the corresponding spring eye. It will be apparent, however, that if the spring leaf on which the eye indicated at 59 is formed, should break, the eye 58 and the spring bolt 60 will still support the vehicle upon the wheel, thus providing an important factor of safety in the construction of the device. The transverse springs are centrally secured to the chassis frame by means of the cross member 19 and tie bolts 66, 67, 68 and 69. Referring particularly to Figure 5, it will be observed that the cross member 19 comprises two channel-shaped members having lateral flanges placed back to back with their webs vertically disposed and that the tie bolts extend through apertures provided in the flanges of the channel-shaped members.

Referring back to Figure 1, it will be observed that motor supporting brackets 71 and 72 are secured to the cross member 19 and to the side frame members 17 and 18. These brackets may be secured by riveting, welding or other suitable means.

From an inspection of Figures 2 and 3, it will be observed that the cross member 19 has a relatively deep central portion tapering up to relatively narrow end portions which are received between the flanges of the channel-shaped side frame members and are rigidly secured to the side frame members as by riveting or welding. The transverse springs are disposed above and below the cross member 19 substantially parallel with the flanges of the channel-shaped members comprising the cross member and are secured to the cross member by apertured clamps 73, 74, 75 and 76, and cooperating apertured plates 78, 79, 80 and 81. Referring to Figures 2 and 3, it will be observed that the plates are disposed between the cross member 19 and the transverse springs and extend transversely of the cross member with the tie bolts projecting through the apertures provided therein. As illustrated in Figure 5, each of the two lower plates 80 and 81 is provided with an offset central portion indicated at 85 between the apertures through which the tie bolts extend to permit flexing of the springs relative to the plates. The clamp members also extend transversely of the cross member and are fitted upon the projecting ends of the tie bolts, each clamp member being provided with a central partition indicated at 87 in Figure 5. Nuts two of which are indicated at 88 and 89 in Figure 5 are screw threaded upon the ends of the tie bolts and serve to hold the clamp members against the corresponding plates to provide rectangular openings through which the springs extend to maintain the springs in alignment with the chassis frame.

Referring to Figure 3, it will be observed that at their centers the spring leaves are provided with cooperating depressions or "dimples" indicated at 90. A U-clamp 92 surrounds the spring at its center and holds the leaves in close contact with each other whereby the cooperating depressions or "dimples" will prevent the spring leaves from slipping relative to each other. The lower ends of the clamp 92 extend through a spring bar 94 which is held thereby in non-slipping relation with the spring leaves, the clamp 92 being tightened upon the spring leaves and the spring bar by screw threaded nuts, one of which is indicated at 95.

Referring to Figure 4, it will be observed that the ends of the spring bar 94 rest upon the plates 78 and 79 and that the spring bar 94 is provided with shoulders 96, 97, 98 and 99 at the four corners thereof which bear against the side portions of the clamps 73 and 74 and serve to maintain the springs 48 and 50 centered relative to the clamps and consequently to the cross member 19. From a further inspection of Figure 3, it will be observed that the spring bar 94 is arched upwardly at its center and that the flanges of the cross member 19 are provided with apertures through which the nuts 95 of the spring clip 92 are adapted to pass. This construction provides for movement of the spring centers relative to the cross member whereby the entire length of the transverse springs may be flexed upon vertical motion of one of the front wheels and at the same time the springs will be firmly secured to the cross member 19 and will be definitely centered in relation thereto. While in the above description reference has been had to the connection between the top springs 48 and 50 and the cross member 19, a similar construction is employed for connecting the lower transverse springs to the cross member. In the latter case, the springs are secured to the cross member by the clamps 75 and 76 and plates 80 and 81, and a spring bar 102 is secured to the center of the springs by means of a U-shaped clip 104 similar in all respects to the clip 92.

Referring now to Figures 1 and 2, it will be observed that a steering gear casing 110 is rigidly secured to the side frame member 18 adjacent to the front end thereof and that a steering column 112 and a steering drop arm 114 project from this casing. The drop arm 114 extends downwardly and forwardly beneath the casing 110 and at its free end is pivotally connected to a tie rod member 115 which has its opposite end pivotally connected to the free end of a steering arm 116 rigidly attached to the hub of the wheel 13. An arm 118 similar to the arm 114 is pivotally connected at one end to a bracket 120 rigidly secured to the side frame member 17 directly across the vehicle from the casing 110. A tie rod member 122 is pivotally connected at one end to the free end of the arm 118 and at the opposite end is pivotally connected to the free end of a steering arm 123 which is rigidly connected to the hub of the wheel 12. A drag link member 125 extends between the arms 114 and 118 and is pivotally connected to these arms adjacent to the free ends thereof.

The steering gear construction just described permits bending of the tie rod and drag link construction to correspond to the flexure of the transverse spring to overcome the tendency of error in steering gear geometry induced by bending of the spring, and at the same time positively transmits the motion of the steering gear to the steering wheels, 12 and 13.

From an inspection of Figure 2, it will be observed that I have provided bumper members, one of which is indicated at 130 to contact with the upper surface of the lower spring to provide a limit for the bending of the springs and thus provide a "bottom" for the independent spring suspension.

While for the sake of simplicity in illustration and description, I have not shown shock absorbers or rebound dampeners applied to the device, it is obvious that such dampeners may readily be applied between the side frame members 17 and 18 and the wheel carrying members or transverse springs.

Having now described my invention so that others skilled in the art may clearly understand the same, what I desire to secure by Letters Patent is as follows:

1. A spring suspension for supporting the front end of a vehicle chassis frame upon the front wheels of the vehicle comprising, a cross member formed of two channel-shaped members, each having flanges and an integral web placed back to back extending between the side members of the chassis frame, wheel carrying brackets to which the front wheel spindles are swively connected, a plurality of transverse springs connected at their ends to said wheel carrying brackets and extending longitudinally of said cross member above and below the same, tie bolts extending vertically through the flanges of said cross member, and apertured spring hangers fitted upon the ends of said tie bolts, said tie bolts being fitted with threaded nuts to urge said spring hangers toward said cross member to clamp said springs therebetween.

2. A spring suspension for supporting the front end of a vehicle chassis frame upon the front wheels of the vehicle comprising, a cross member formed of two channel-shaped members, each having flanges and an integral web placed back to back extending between the side members of the chassis frame, wheel carrying brackets to which the front wheel spindles are swively connected, a plurality of transverse springs connected at their ends to said wheel carrying brackets and extending longitudinally of said cross member above and below the same, tie bolts extending vertically through the flanges of said cross member, apertured plates fitted over the ends of said tie bolts and disposed between said springs and said cross member, and apertured spring hangers fitted upon the ends of said tie bolts, said tie bolts being fitted with threaded nuts to urge said spring hangers toward said cross member to enclose said springs between said spring hangers and said plates.

3. A spring suspension for supporting the front end of a vehicle chassis frame upon the front wheels of the vehicle comprising, a cross member formed of two channel-shaped members, each having flanges and an integral web placed back to back extending between the side members of the chassis frame, wheel carrying brackets to which the front wheel spindles are swively connected, a plurality of transverse springs connected at their ends to said wheel carrying brackets and extending longitudinally of said cross member above and below the same, tie bolts extending vertically through the flanges of said cross member, apertured spring hangers fitted upon the ends of said tie bolts adapted to hold said springs in alignment with said cross member, and a spring bar centrally secured to said springs and bearing at its ends against said spring hangers to restrain said springs from longitudinal motion through said spring hangers and at the same time permit flexure of that part of the springs included between said spring hangers.

4. A spring suspension for supporting the front end of a vehicle chassis frame upon the front wheels of the vehicle comprising, a cross member formed of two channel-shaped members, each having flanges and an integral web placed back to back extending between the side members of the chassis frame, wheel carrying brackets to which the front wheel spindles are swively connected, a plurality of transverse springs connected at their ends to said wheel carrying brackets and extending longitudinally of said cross member above and below the same, spaced tie bolts extending vertically through the flanges of said cross member, apertured spring hangers fitted upon the ends of said tie bolts adapted to secure said transverse springs to said cross member, an arched spring bar centrally connected to the centers of each set of upper and lower springs against longitudinal motion relative thereto, said spring bar being formed with shoulders at each end thereof to abut against said spring hangers to restrain said springs from longitudinal motion relative to said hangers and at the same time permit flexure of that portion of the springs included between said spring hangers.

DELMAR G. ROOS.